United States Patent [19]

Kress

[11] 4,329,115

[45] May 11, 1982

[54] DIRECTIONALLY STABILIZED WIND TURBINE

[75] Inventor: Robert W. Kress, Lloyd Harbor, N.Y.

[73] Assignee: Grumman Aerospace Corporation, Bethpage, N.Y.

[21] Appl. No.: 230,203

[22] Filed: Feb. 2, 1981

[51] Int. Cl.³ .............................................. F03D 7/04
[52] U.S. Cl. .................................. 416/11; 416/236 A
[58] Field of Search ............................. 416/11, 236 A

[56] References Cited

U.S. PATENT DOCUMENTS

| 1,633,842 | 6/1927 | Bishop | 416/11 |
| 1,820,529 | 8/1931 | Darrieus | 416/11 |
| 2,426,742 | 9/1947 | Pawlowski | 416/236 A |
| 4,093,402 | 6/1978 | Van Holten | 416/236 A |

FOREIGN PATENT DOCUMENTS

| 830627 | 2/1952 | Fed. Rep. of Germany | 416/236 A |
| 2825061 | 12/1979 | Fed. Rep. of Germany | 416/11 |
| 943749 | 3/1949 | France | 416/11 |
| 974952 | 2/1951 | France | 416/11 |
| 988883 | 9/1951 | France | 416/11 |
| 213022 | 3/1924 | United Kingdom | 416/11 |

Primary Examiner—Everette A. Powell, Jr.
Attorney, Agent, or Firm—Mellor A. Gill

[57] ABSTRACT

A downwind rotor wind turbine having a rotor with a horizontal axis carried for operation on the downwind end of a pod or nacelle pivotally mounted on a vertical pivot located upwind of the rotor on the top of an elevated structure. Each blade is provided at its tip with a tip plate. The tip plates have a surface area large enough to provide an aerodynamic force on the rotor when the wind shifts away from the rotational axis of the rotor such that a restoring moment is furnished about the turbine pivot to turn the turbine automatically back into the wind.

1 Claim, 7 Drawing Figures

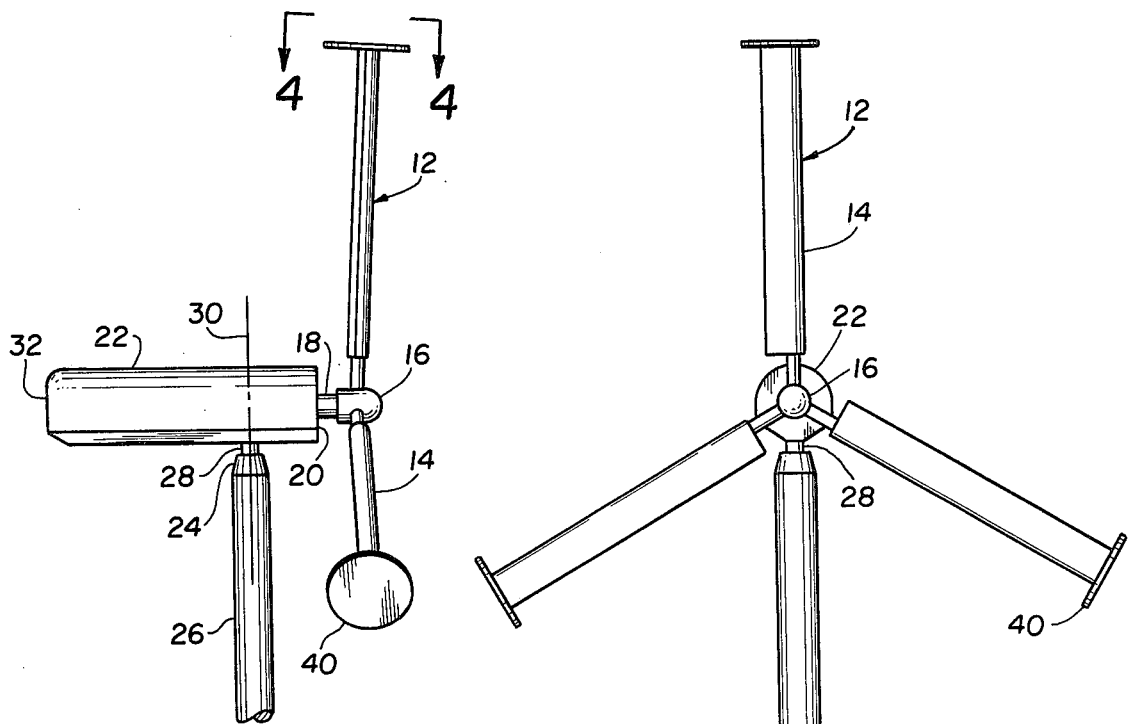
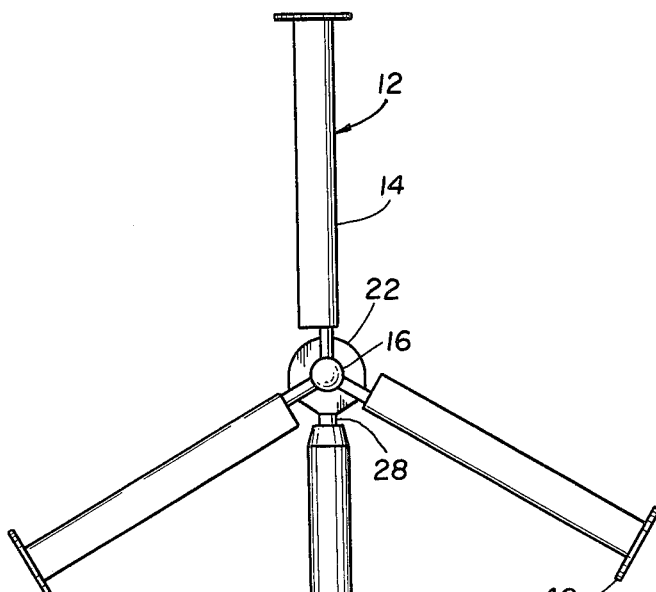
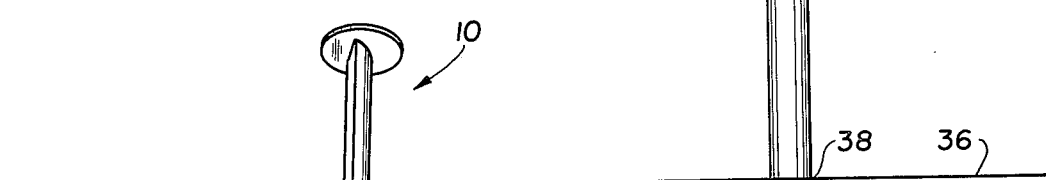
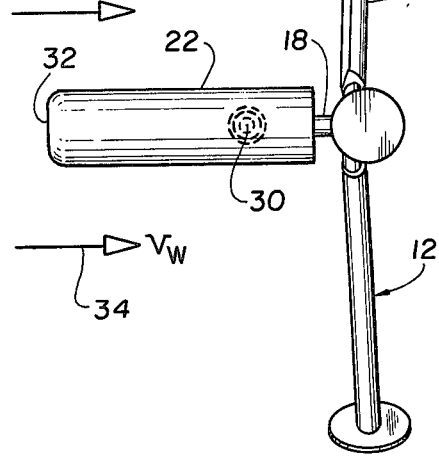
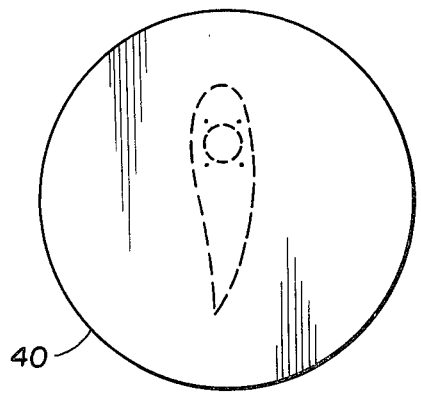
FIG.1
FIG.2
FIG.3
FIG.4

DIRECTIONALLY STABILIZED WIND TURBINE

BACKGROUND OF THE INVENTION

Field of the Invention

The present invention relates to wind engines such as wind turbines and, more particularly, to a wind turbine having aerodynamic means for keeping the turbine pointing automatically into the wind.

Background of the Invention

Wind engines or windmills have been in use for centuries dating back to contrivances used for milling grain or lifting water in Persia about the 7th century AD. For well over a century and a half windmills have been used extensively for domestic water supply, but the use for that purpose has declined because of the spread of electricity and rural water supplies. However, in the more sparsely populated areas of the United States, Australia, and South Africa, many thousands of windmill pumps are still being installed.

At the present time, the energy crisis has led to an increasing use of wind turbines for the generation of electrical power. A design which is becoming widely used, particularly for machines producing high power, is one in which the generating equipment is contained in a pod on which the turbine rotor is mounted, the pod being positioned on the top of a tall tubular tower. To take advantage of the weathercocking effect, the pivot about which the pod swings is displaced forward of the mid-point of the longitudinal length of the pod such that the rotor operates at the trailing edge of the pod. These machines are said to have a downwind rotor; wind machines having the rotor placed forward of the pivot point of the body or pod carrying the rotor are said to have an upwind rotor. Because of various causes the directional stability or the ability of downwind rotor wind turbines to align precisely into the wind leaves much to be desired. The wind turbine of this invention has been designed to alleviate the directional stability problem of trailing rotor wind turbines.

DESCRIPTION OF THE PRIOR ART

Early windmills conventionally were of the upwind rotor type having the rotor forward of the pivot of the machine. These early windmills were turned into the wind manually by means of a tail pole which was pulled around by the miller. Later a small wind-wheel called a fantail was fitted, the axis of rotation of the fantail being located perpendicular to the axis of rotation of the windmill. When the windmill was facing directly into the wind, the fantail did not turn. But if the wind shifted, the fantail would be rotated. In the apparatus, the fantail was geared to wheels running on a circular track such that the mill was slowly moved back into the wind automatically without intervention by the miller. Smaller present day wind machines conventionally are of the upwind rotor type and have a tail vane or rudder to keep them pointed into the wind. With respect to downwind rotor wind turbines, the prior art has apparently relied on their weathercocking ability to keep them pointing into the wind, because there appears to be a lack of any teaching in the prior art of means being provided to improve the directional stability of that type of wind turbine.

SUMMARY OF THE INVENTION

This invention is a downwind rotor wind turbine having a rotor with a horizontal axis carried for operation on a pod or nacelle pivotally mounted on the top of a tubular tower or other elevated structure. Electrical generating equipment is carried in the pod and is driven by the rotor directly or through the medium of an appropriate gear train. Generator output voltage is passed by means of a collector ring arrangement to an electrical conduit in the wind turbine tower for transmission to the point of use. A three or four bladed rotor is used and the hub can be provided with means to "feather" or change the pitch of the blades. Each blade is provided at its tip with a tip plate, the plates being either flat or contoured and having a circular or other geometric shape in plan view. The tip plates increase the restoring moment of the rotor about the yaw axis when the wind direction has shifted away from the spin axis to assist in re-aligning the rotor into the wind.

It is a principal object of the invention, therefore, to provide a downwind rotor wind turbine having aerodynamic means to improve greatly the directional stability of the rotor about its yaw axis and to minimize directional overshoot.

It is another object of the invention to provide aerodynamic means for directionally stabilizing downwind rotor wind turbines, which means can be readily installed to retrofit existing machines.

It is a further object of the invention to provide efficient, low cost, reliable, maintenance-free means for directionally stabilizing downwind rotor wind turbines.

Other and further objects of the invention will become apparent from the detailed description of the invention given in the accompanying specification and drawings.

DESCRIPTION OF THE DRAWINGS

For the purpose of illustrating the invention, there is shown in the drawings the forms that are presently preferred; however, it should be understood that the invention is not necessarily limited to the precise instrumentalities or arrangement shown.

FIG. 1 is a left side elevation of the wind turbine of the invention;

FIG. 2 is a rear elevation of the wind turbine of the invention;

FIG. 3 is a top view of the wind turbine of the invention;

FIG. 4 is a plan view taken along line 4—4 of FIG. 1 of an end plate embodied in the wind turbine of the invention;

DESCRIPTION OF THE PREFERRED EMBODIMENTS

Figure 5:
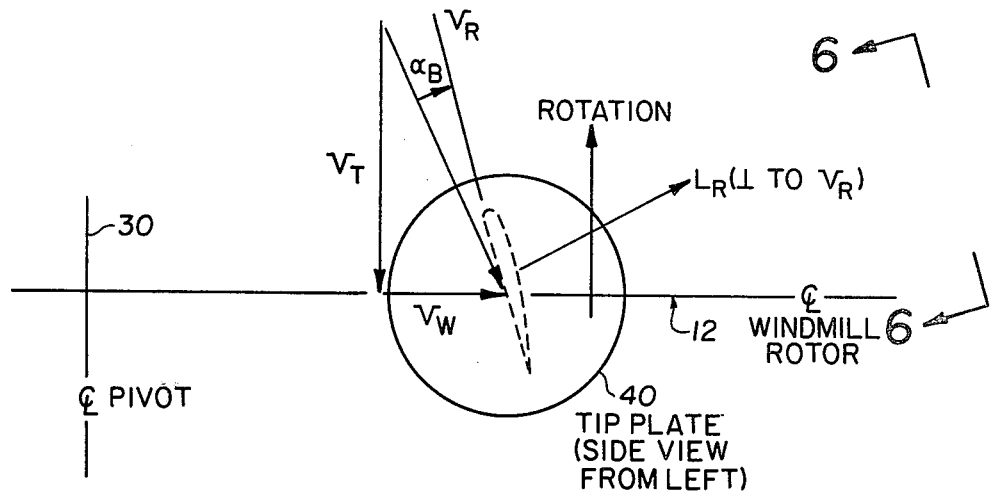
FIG. 5 is a simplified vector diagram of the forces acting in operation on the rotor blade of the wind turbine of FIG. 1.

Referring now to the drawings, FIGS. 1-3 illustrate the horizontal axis wind turbine 10 of the invention. Wind turbine 10 has a rotor 12 having (in this case) three blades 14 mounted on a hub 16 which is fixed on a shaft 18 journaled in suitable bearings (not shown) in the end 20 of a pod or nacelle 22. Pod 22 can house electrical generating equipment (not shown) which is driven directly or through a suitable drive train by the rotor shaft 18. Pod 22 is mounted on the top 24 of a raised structure such as a tubular tower 26 by means of a pivot 28 whose axis forms the yaw axis 30 of the turbine. The pivot is suitably journaled into the pod to permit it to swing freely about axis 30 to allow the rotor to be aligned into the prevailing wind. As indicated in FIG. 3, the rotor 12 is downwind of the nacelle pivot 30, thus the wind turbine tends to weathercock such that the leading edge 32 of the nacelle has a tendency to point into the wind (indicated by arrows 34). Tower 26 is erected on the ground 36 or other suitable surface using accepted construction techniques and the base end 38 thereof can be embedded in concrete for added strength. The electrical power output from the generator is passed by means of slip rings at the nacelle pivot to an electrical conduit which runs down the tower and connects to a power grid or other utilization system. These electrical means are in common use in the art and it is not believed necessary to illustrate them or to go into further detail with respect thereof herein.

In the embodiment illustrated in FIGS. 1-3, a 3-bladed rotor is shown. It will be appreciated, of course, that the showing is not intended as a limitation thereto as a rotor with more or less blades can be used effectively in the invention. As is also known, an appropriate pitch changing mechanism can be incorporated in the hub 16 to change the blade pitch and to "feather" the blades as required. Suitable means for braking the rotor can also be provided. In this invention to improve directional stability in the yaw direction, a tip plate 40 is provided on the tip of each blade 14 of the rotor.

In the design of the tip plate 40, the following considerations are believed operative. With reference now to FIG. 5, where:

$V_T$ = Airspeed relative to the blade due to blade rotation.
$V_W$ = Wind speed.
$V_R$ = Wind vector relative to blade.
$\alpha_B$ = Blade angle of attack.
$L_R$ = Blade lift vector.

The vector diagram depicts the forces acting in operation on the blades of the rotor.

Figure 6:
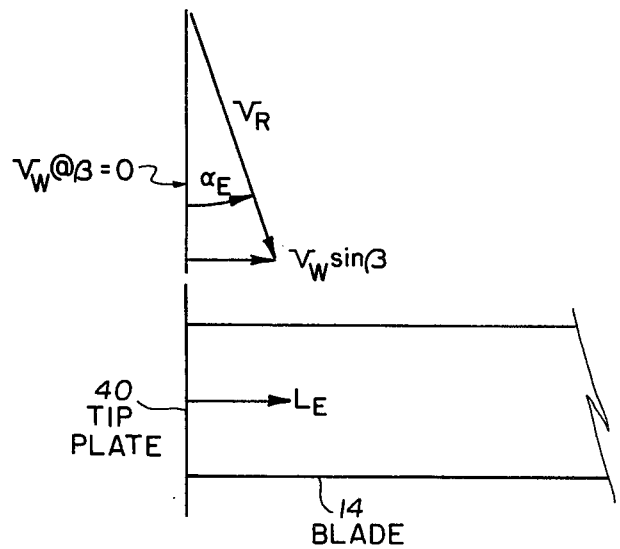
FIG. 6 is a simplified vector diagram taken along line 6—6 of FIG. 5 of the lift forces acting on the end plate of FIG. 4.

FIG. 6 is a vector diagram of the tip plate lift, where the lift equation is:

$$L_E = \tfrac{1}{2}\rho V_R^2 S_E C_{L\alpha_\epsilon} \alpha_E$$

where:
$L_E$ = Tip plate lift.
$C_{L\alpha E}$ = Tip plate lift curve slope per radian.

$\alpha_E = \sin^{-1}(V_W/V_R) \sin \beta$
$\beta$ = Yaw angle of wind turbine with respect to wind.
$S_E$ = Tip plate area.
$\rho$ = Air density.

Figure 7:
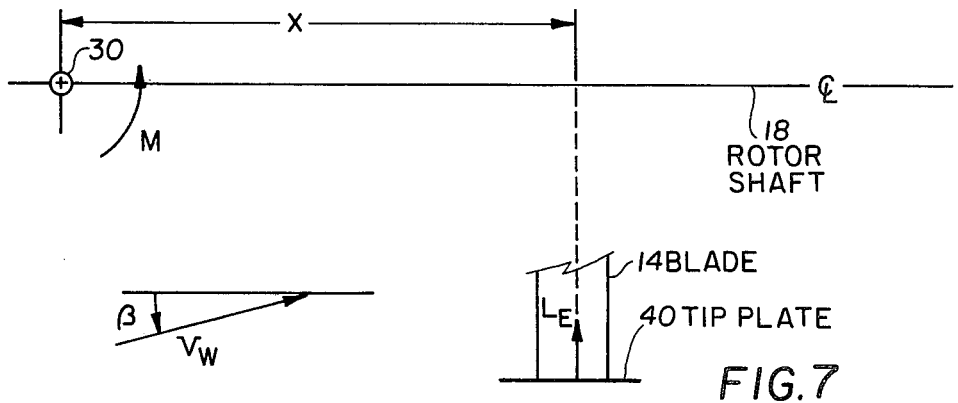
FIG. 7 is a simplified vector diagram of the directional stabilization forces acting about the yaw axis of the wind turbine of the invention.

FIG. 7 is a vector diagram of the directional stabilization forces acting about the yaw axis 30 of the wind turbine, where the yaw moment equation is:

$$M = XL_E = \tfrac{1}{2}\rho V_R^2 S_E C_{L\alpha_\epsilon} \alpha_E X$$

where:
X = Distance of center of pressure aft of turbine pivot 30.
M = Yawing moment about pivot 30.

This yaw moment is seen to be of a direction that will cause the wind turbine to rotate about the pivot 30 and point into the wind, driving $\beta$ to zero. A similar analysis will show that the downgoing blade is subject to the same effect and the forces are additive.

Although shown and described in what is believed to be the most practical and preferred embodiments, it is apparent that departures from the specific method and apparatus described will suggest themselves to those skilled in the art and may be made without departing from the spirit and scope of the invention. I, therefore, do not wish to restrict myself to the particular methods illustrated and described, but desire to avail myself of all modifications that may fall within the scope of the appended claims.

Having thus described my invention, what I claim is:
1. A wind turbine comprising an elongated pod-like body having an upwind and downwind longitudinal end, said body being pivotally mounted intermediate said longitudinal ends on a pivot on elevated structure, said pivot forming the yaw axis of said turbine, a shaft mounted for rotation on said downwind end of said body, a hub fixed on said shaft, at least one blade designed to be driven by the wind carried on said hub, a tip plate on the radially outer end of said blade, said tip plate having a surface area large enough to provide an aerodynamic force on said blade when the wind shifts away from the rotational axis of said blade whereby a restoring moment about said yaw axis to turn said turbine into the wind is provided, and wherein said restoring moment is equal to the distance of the center of pressure of said tip plate from said pivot times the lift of said tip plate, and wherein the tip plate lift is the product of one-half the air density, the square of the wind vector relative to said blade, the area of said tip plate, the lift curve slope per radian of said tip plate, and the angle of attack of the tip plate to the relative wind which is the inverse sine of the wind speed divided by the wind vector relative to said blade times the yaw angle of the wind turbine axis to the wind.

* * * * *